US012632316B2

(12) United States Patent
Singh et al.

(10) Patent No.: US 12,632,316 B2
(45) Date of Patent: May 19, 2026

(54) SECURE MEMORY DEVICE ACCESS CONTROL BY ABSTRACTED RESOURCES OF A DATA PROCESSING SYSTEM

(71) Applicant: Dell Products L.P., Round Rock, TX (US)

(72) Inventors: Ankit Singh, Bangalore (IN); Shrikant U. Hallur, Bangalore (IN); Naveen Awasthy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 91 days.

(21) Appl. No.: 18/618,328

(22) Filed: Mar. 27, 2024

(65) Prior Publication Data

US 2025/0307025 A1    Oct. 2, 2025

(51) Int. Cl.
*G06F 9/50* (2006.01)
*G06F 3/06* (2006.01)
*G06F 9/455* (2018.01)

(52) U.S. Cl.
CPC .......... *G06F 9/5077* (2013.01); *G06F 3/0622* (2013.01); *G06F 3/0631* (2013.01); *G06F 3/0679* (2013.01); *G06F 9/45558* (2013.01); *G06F 2009/45583* (2013.01); *G06F 2009/45587* (2013.01)

(58) Field of Classification Search
CPC .. G06F 9/5077; G06F 9/45558; G06F 3/0622; G06F 3/0631; G06F 3/0679; G06F 2009/45583; G06F 2009/45587
See application file for complete search history.

(56) References Cited

U.S. PATENT DOCUMENTS

| | | |
|---|---|---|
| 6,668,376 B1 | 12/2003 | Wang |
| 6,854,054 B1 | 2/2005 | Kavanagh |
| 7,130,997 B2 | 10/2006 | Hsu |
| 8,136,900 B2 | 3/2012 | Iwasaki |
| 8,346,985 B2 | 1/2013 | Chassot |
| 9,152,402 B2 | 10/2015 | Scheidel et al. |
| 9,875,115 B2 | 1/2018 | Russinovich |

(Continued)

OTHER PUBLICATIONS

S. Jin, J. Ahn, S. Cha and J. Huh, "Architectural support for secure virtualization under a vulnerable hypervisor," 2011 44th Annual IEEE/ACM International Symposium on Microarchitecture (MICRO), Porto Alegre, Brazil, 2011, pp. 272-283. (Year: 2011).*

*Primary Examiner* — Curtis James Kortman
(74) *Attorney, Agent, or Firm* — WOMBLE BOND DICKINSON (US) LLP

(57) ABSTRACT

Methods and systems for managing access to a memory device of a data processing system that is shared between a plurality of abstracted resources hosted on the data processing system are disclosed. A memory device may have a secured portion storing information that is used to authenticate requests from the plurality of abstracted resources for accessing the shared memory device. Access to and modification of the secured portion of the shared memory device is granted only to a management entity of the data processing system. The management entity registers memory address ranges of the memory device allocated to each of the plurality of abstracted resources in the secured portion. The management entity uses the registered memory address ranges to verify memory device access requests from the plurality of abstracted resources.

20 Claims, 8 Drawing Sheets

(56)  References Cited

U.S. PATENT DOCUMENTS

| | | | |
|---|---|---|---|
| 9,990,325 | B2 | 6/2018 | Hetzler |
| 10,901,627 | B1 * | 1/2021 | Bshara ................ G06F 9/45558 |
| 11,212,123 | B2 | 12/2021 | Yoon |
| 11,282,161 | B2 | 3/2022 | Ray et al. |
| 11,489,827 | B2 | 11/2022 | Knotwell et al. |
| 11,556,359 | B2 | 1/2023 | Hart et al. |
| 11,768,781 | B2 | 9/2023 | Cooray et al. |
| 11,770,246 | B2 | 9/2023 | Ong |
| 11,775,651 | B2 | 10/2023 | Jacobs |
| 12,299,184 | B2 | 5/2025 | Wheeler |
| 12,353,609 | B2 | 7/2025 | Nelogal |
| 2004/0210897 | A1 | 10/2004 | Brockway |
| 2007/0198996 | A1 | 8/2007 | Chiu |
| 2009/0054045 | A1 | 2/2009 | Zakrzewski |
| 2011/0055541 | A1 | 3/2011 | Lee |
| 2012/0023319 | A1 | 1/2012 | Chin |
| 2012/0060023 | A1 | 3/2012 | Park |
| 2013/0276144 | A1 | 10/2013 | Hansen |
| 2016/0364297 | A1 | 12/2016 | Lo |
| 2018/0032349 | A1 | 2/2018 | Bhimanadhuni |
| 2019/0068772 | A1 | 2/2019 | Lo |
| 2020/0074083 | A1 | 3/2020 | Hou |
| 2020/0242051 | A1 | 7/2020 | Bisa |
| 2020/0244445 | A1 | 7/2020 | Ponnusamy |
| 2020/0250293 | A1 | 8/2020 | Paulraj |
| 2020/0356669 | A1 | 11/2020 | Kim |
| 2021/0034132 | A1 | 2/2021 | Hamlin |
| 2021/0099519 | A1 | 4/2021 | Christian |
| 2022/0222349 | A1 | 7/2022 | Lambert |
| 2023/0132176 | A1 | 4/2023 | Nelogal |
| 2023/0136229 | A1 * | 5/2023 | Lee ......................... G06F 21/79 |
| | | | 726/16 |
| 2023/0229454 | A1 | 7/2023 | Lagnado |
| 2023/0259472 | A1 | 8/2023 | Azam |
| 2023/0297261 | A1 | 9/2023 | Kim |
| 2024/0362370 | A1 * | 10/2024 | Jain ......................... G06F 21/72 |

* cited by examiner

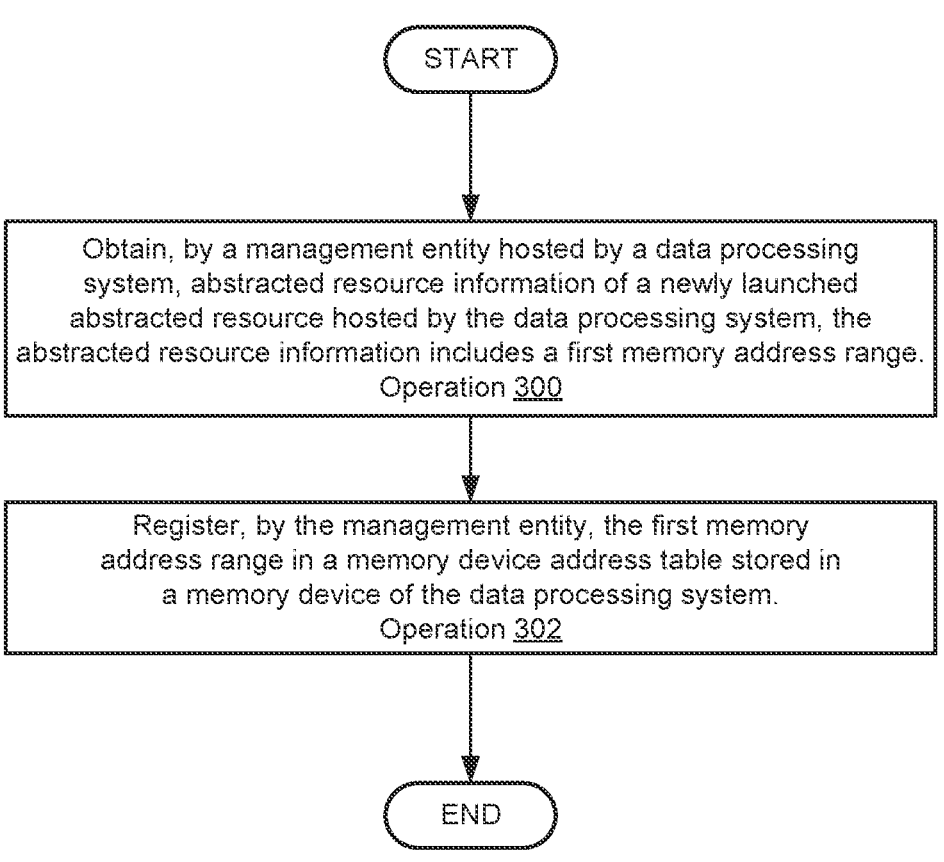

START

Obtain, by a management entity hosted by a data processing system, abstracted resource information of a newly launched abstracted resource hosted by the data processing system, the abstracted resource information includes a first memory address range.
Operation 300

Register, by the management entity, the first memory address range in a memory device address table stored in a memory device of the data processing system.
Operation 302

END

FIG. 3A

SECURE MEMORY DEVICE ACCESS CONTROL BY ABSTRACTED RESOURCES OF A DATA PROCESSING SYSTEM

FIELD

Embodiments disclosed herein relate generally to memory device access control. More particularly, embodiments disclosed herein relate to systems and methods to manage access to one or more memory devices by abstracted resources hosted by a data processing system (e.g., a computing device).

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components and the components of other devices may impact the performance of the computer implemented services. Users may input commands and interact with computing devices using HIDs.

BRIEF DESCRIPTION OF THE DRAWINGS

Embodiments disclosed herein are illustrated by way of example and not limitation in the figures of the accompanying drawings in which like references indicate similar elements.

FIGS. 3A-3B show flowcharts in accordance with one or more embodiments.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

Figure 4:
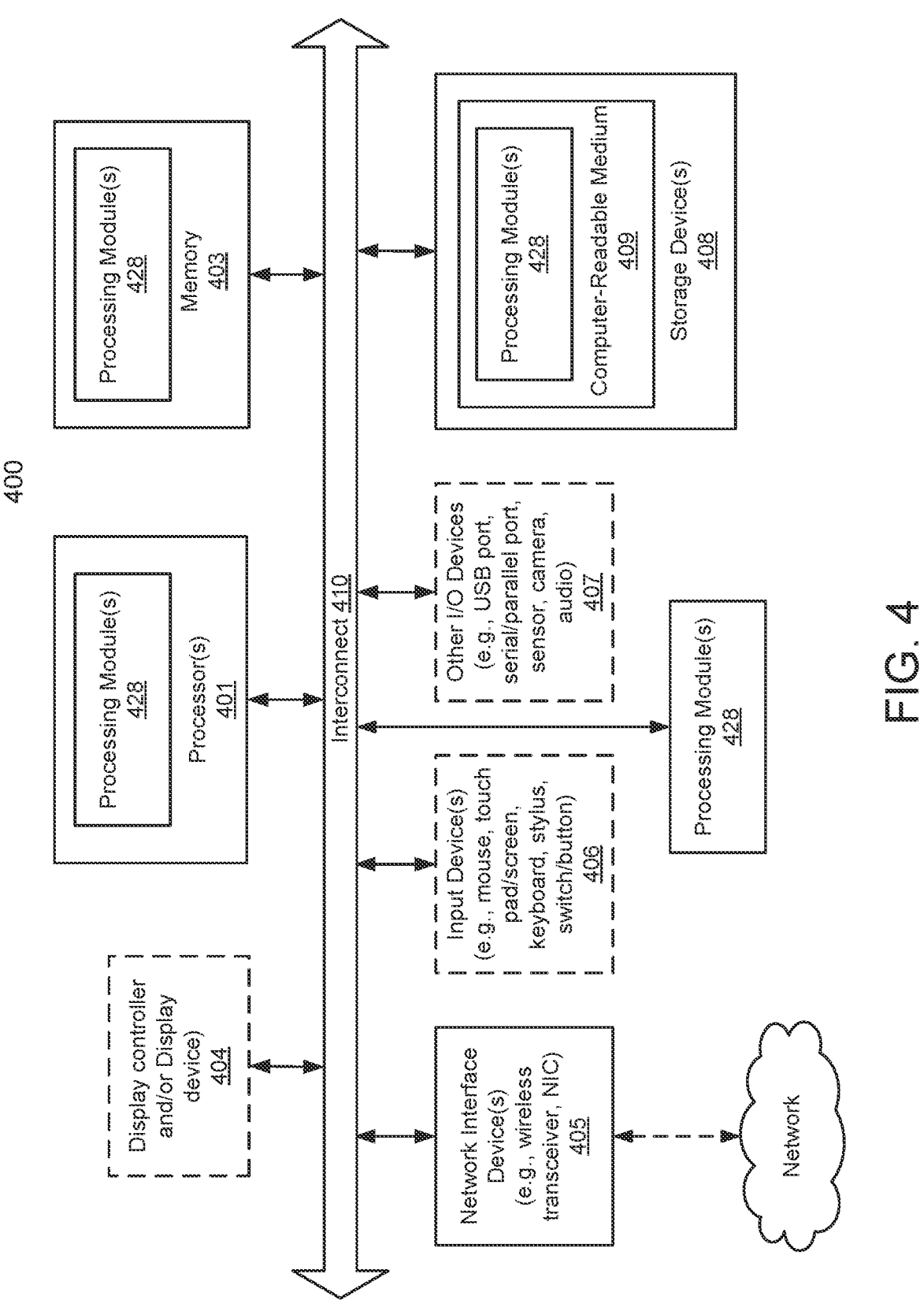
FIG. 4 shows a block diagram illustrating a computing device in accordance with one or more embodiments.

In general, embodiments disclosed herein relate to methods and systems for managing access to a memory device of a data processing system (such as a non-volatile memory express (NVMe) based solid-state drive (SSD), or the like) that is shared between a plurality of abstracted resources hosted on the data processing system (such as computing devices, as described below in reference to FIG. 4).

In particular, virtualization has become one of the strongest pillars of today's modern client world. With virtualization, multiple abstracted resources (e.g., virtual machines, application containers (or simply referred to herein as "containers"), or the like) that share a host data processing system's components and resources (e.g., hardware and/or software components and resources) may be instantiated within the host data processing system. For example, each instantiated VM may include a separate operating system (OS) installation allowing for multiple OSs to be installed and running on the host data processing system.

More specifically, using VM architecture as a non-limiting example, a hypervisor architecture may be instantiated to create and control one or more VMs on a host data processing system (and/or to control the host data processing system's components and resources). Such creation and control may be configured using a special privileged domain (e.g., a domain 0), which may also act as a host system of the created VMs. Each created VM may user their frontend drivers to deliver operation requests (e.g., data read, write, and sharing requests, or the like) to a backend driver of the special privileged domain. The backend driver then accesses the host data processing system's components and resources (e.g., the actual physical hardware of the host data processing system) to accomplish the operation requests.

In such architectures, each of these abstracted resources may be provided access to the host data processing system's components and resources such as a memory device of the host data processing system. This memory device not only stores the host's data (e.g., traffic statistics, packet headers, service requests, operating system calls, file-system changes, or the like) but also stores data used and created by each of these abstracted resources. Thus, even if one of these abstracted resources is compromised (e.g., by a bad actor such as a hacker or the like), such data stored in the memory device (referred to herein as "data associated with the plurality of abstracted resources hosted on a data processing system") may also be compromised.

Such access to the host data processing system's components and resources may cause issues and inconveniences to users of the data processing system. For example, current surveillance methods such as data encryption, guest OS integrity, or the like leave space for leaking and tampering of confidential data in case of sharing virtual disk data. Configuring these abstracted resources to conducting full-time monitoring of compromises by bad actors negatively impacts the operating speed of these abstracted resources. Once illegal sharing between abstracted resources is detected (e.g., one the data associated with the of abstracted resources has been compromised), there is no method to prohibit such sharing in real time. Additionally, unauthorized access to the privileged domain (e.g., through a compromised VM) can spoil, steel, and/or damage data of all other VMs running on the host data processing system.

To resolve the above-discussed inconveniences, a management entity (e.g., management entity 110 discussed below in more detail in reference to FIGS. 1B and 1C) may be instantiated and/or configured to facilitate communication and access between the abstracted resources and one or more of the host data processing system's components and resources (namely, a memory device being shared by the abstracted resources).

In particular, each time a new abstracted resource is created, the management entity may register a memory address (of the memory device) used by (e.g., allotted to) the newly created abstracted resource in a memory device address table stored in a secured portion (e.g., a relay protected memory block (RPMB), or the like) of the memory device (e.g., a non-volatile memory express (NVMe) based solid-state drive (SSD), or the like). Each time this newly created abstracted resource wishes to access the memory device (e.g., to perform a read, write, or sharing of data), the newly created abstracted resource must also include the memory address in its access request. The management entity may then verify (e.g., by matching the provided memory address with the registered memory address) the access request to accept or deny the access request.

For example, assume that the memory device of the data processing system has 8 GB of space and that creation of a VM (VM1) requires use of 1 GB of this 8 GB. When VM1 is created, the memory address range of the 1 GB in the available 8 GB of the memory device is also established (e.g., memory address range A-B covering 1 GB of data of available memory address range A-P covering the full 8 GB available in the memory device). This address range A-B allotted to VM 1 is then stored in the memory device address table in the secured portion of the memory device. If VM1 subsequently provides memory address range A-B in a request to access the memory device, such access (and operations associated with the request) will be granted. If VM1 subsequently provides any memory address range outside of memory address range A-B, such access (and operations associated with the request) will be denied (e.g., rejected).

Thus, a potentially compromised abstracted resource will not be able to easily access data used by the other abstracted resources and data used by the host of the data processing system that are all stored within the same memory device (e.g., a shared memory device). Naturally, embodiments disclosed herein may provide, among others, an improvement to the above-discussed inconveniences of existing abstracted resource architectures with shared data that is easily accessible between created abstracted resources (e.g., an existing technical problem in the present technical field of embodiments disclosed herein).

Embodiments disclosed herein also improve the overall functionalities of the data processing system hosting such an abstracted resource architecture. In particular, by having a single management entity control the access (e.g., security) to the memory device, there is no longer a need to have each operating abstracted resource to conduct full-time monitoring and checking of compromises by bad actors. This directly results in the saving of additional computing resources (e.g., computing resource of the data processing system) that may need to be allocated to each abstracted resource to conduct monitoring and checking, and such saved computing resources can be used to enhance the operational capabilities of the data processing system in other ways. Thus, effectively resulting in a direct improvement to the computer functionalities of the data processing system.

In an embodiment, a method for managing access to a memory device of a data processing system that is shared between a plurality of abstracted resources hosted on the data processing system is provided. The method may include: obtaining a data management request associated with the memory device, the data management request comprises abstracted resource verification information; verifying the abstracted resource verification information against a memory device address table stored in a secured portion of the memory device shared between the plurality of abstracted resources; and executing one or more actions based on a result of the verifying of the abstracted resource verification information to fulfill or reject the data management request.

The verifying of the abstracted resource verification information is performed by a management entity hosted within the data processing system, the management entity and the plurality of abstracted resources being ones of components and resources of the data processing system. Among the components and resources of the data processing system, the secured portion of the memory device is only accessible and modifiable by the management entity.

The memory device is non-volatile memory, the secured portion is a relay protected memory block (RPMB) of the non-volatile memory, and each of the plurality of abstracted resources is a virtual machine (VM) or an application container.

The data management request is obtained from an abstracted resource of the plurality of abstracted resources. The abstracted resource is registered to a first memory address range stored in the memory device address table. The abstracted resource verification information comprises a second memory address range. Verifying the abstracted resource verification information against the memory device address table comprises determining whether the second memory address range matches the first memory address range.

Data associated with the plurality of abstracted resources is stored in a non-secured portion of the memory device and is accessible by the plurality of abstracted resources through verification using information stored in the secured portion of the memory device. The data management request comprises a request to access the non-secured portion storing the data associated with the plurality of abstracted resources. In response to determining that the second memory address range matches the first memory address range, executing the one or more actions comprises permitting the abstracted resource to access the non-secured portion of the memory device.

Before the data management request is obtained from the abstracted resource, the method may further include: obtaining, by a registration engine of the management entity and when the abstracted resource is first launched by the data processing system, abstracted resource information of the abstracted resource, the abstracted resource information comprising the first memory address range; and registering, by the registration engine, the first memory address range in the memory device address table by modifying the memory device address table in the secured portion of the memory device to include the first memory address range.

Each of the plurality of abstracted resources is associated with a memory address range among a plurality of memory address ranges stored in the memory device address table, the first memory address range being one of the plurality of memory address ranges, and none of the plurality of memory address ranges overlap.

Each of the plurality of memory address ranges indicate an amount of storage resources and a space within the memory device that is allocated for instantiating and maintaining operations of respective ones of the plurality of abstracted resources.

Each of the plurality of abstracted resources is a virtual machine (VM) or an application container, data associated with the plurality of abstracted resources is stored in a non-secured portion of the memory device.

Accessing the non-secured portion of the memory device provides the abstracted resource with access to only data in the non-secured portion that is associated with the abstracted resource and is accessible by the plurality of abstracted resources through verification using information stored in the secured portion of the memory device. The data associated with the plurality of abstracted resources comprises data of each of the plurality of abstracted resources, data of a hypervisor or a docker that launches each of the plurality of abstracted resources, and data of a special privileged domain that serves as an administrative interface between the hypervisor and each of the plurality of abstracted resources that is the VM.

A non-transitory media may include instructions that when executed by at least a processor of a data processing system cause the computer-implemented method to be performed by the data processing system.

A data processing system may include the non-transitory media and a processor, and may perform the computer-implemented method when processor executes the instructions in the non-transitory media.

Figure 1A:
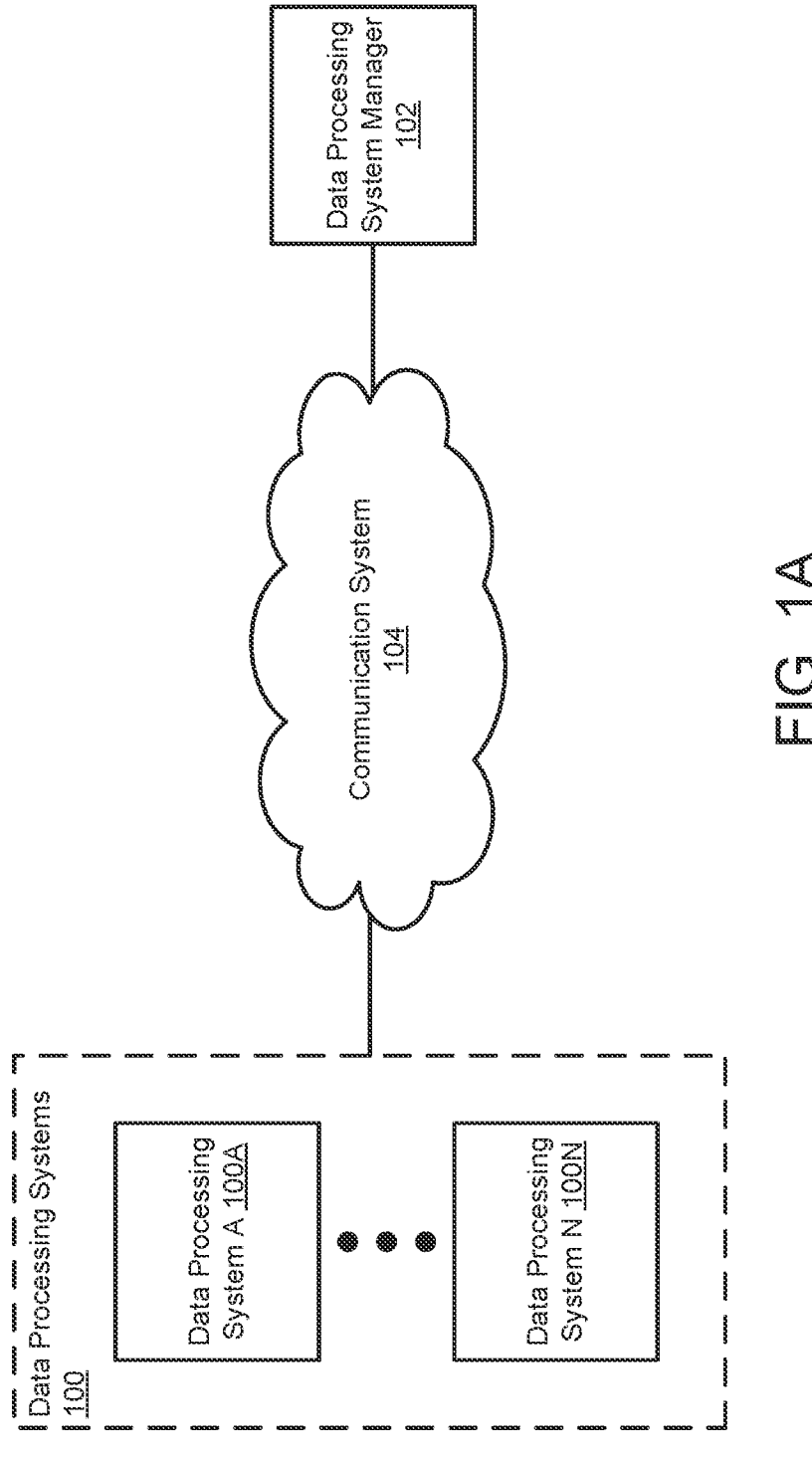
FIG. 1A shows a block diagram illustrating a system in accordance with one or more embodiments.

Turning to FIG. 1A, a block diagram illustrating a system in accordance with an embodiment is shown. The system shown in FIG. 1A may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, a data processing system may execute a method for managing access to a memory device of a data processing system that is shared between a plurality of abstracted resources hosted on the data processing system are disclosed. In particular, a memory device of the data processing system may be configured with a secured portion storing information that is used to authenticate requests to access the memory device from the plurality of abstracted resources for accessing the shared memory device.

Access to and modification of the secured portion of the shared memory device may be granted only to a management entity of the data processing system. The management entity may register memory address ranges of the memory device allocated to each of the plurality of abstracted resources in the secured portion. The management entity may then use the registered memory address ranges to verify memory device access requests from the plurality of abstracted resources. Thus, the above-discussed improvements of embodiments disclosed herein may be realized by the data processing system.

To provide the above noted functionality, the system of FIG. 1A may include any number of data processing systems 100 (e.g., data processing systems 100A-100N). Data processing systems 100 may provide the computer implemented services to users of data processing systems 100 and/or to other devices (not shown). Different data processing systems may provide similar and/or different computer implemented services.

To provide the computer implemented services, data processing systems 100 may include various hardware components (e.g., processors, memory modules, storage devices, etc.) and host various software components (e.g., operating systems, application, startup managers such as basic input-output systems, etc.). These hardware and software components (discussed in more detail below in FIG. 1B) may provide the computer implemented services via their operation.

The software components may be implemented using various types of services. For example, each data processing system of the data processing systems 100 may host various services that provide the computer implemented service (e.g., application services) and/or that manage the operation of these services (e.g., management services). The aggregate (e.g., combination) of the management and application services may be a complete service that provide desired functionalities.

To manage the data processing systems 100, the system of FIG. 1A may include data processing system manager 102. Data processing system manager 102 may include various hardware components (e.g., processors, memory modules, storage devices, etc.) and host various software components (e.g., operating systems, application, startup managers such as basic input-output systems, etc.). These hardware and software components may provide the functionalities (e.g., the communication with and management of the data processing systems) of the data processing system manager 102.

In one example, the data processing system manager 102 may be a computing device (e.g., computing device of FIG. 4) such as a desktop computer or server that is used by used by manufacturers (or distributors, administrators, etc.) of one or more components installed within the data processing systems 100 to communicate with and manage (namely, the components installed within) the data processing systems 100.

Any of the components illustrated in FIG. 1A may be operably connected to each other (and/or components not illustrated) with communication system 104. In an embodiment, communication system 104 includes one or more networks that facilitate communication between any number of components. The networks may include wired networks and/or wireless networks (e.g., and/or the Internet). The networks may operate in accordance with any number and types of communication protocols (e.g., such as the Internet Protocol).

While FIG. 1A is illustrated as including a limited number of specific components, a system in accordance with an embodiment may include fewer, additional, and/or different components than those illustrated therein.

Figure 1B:
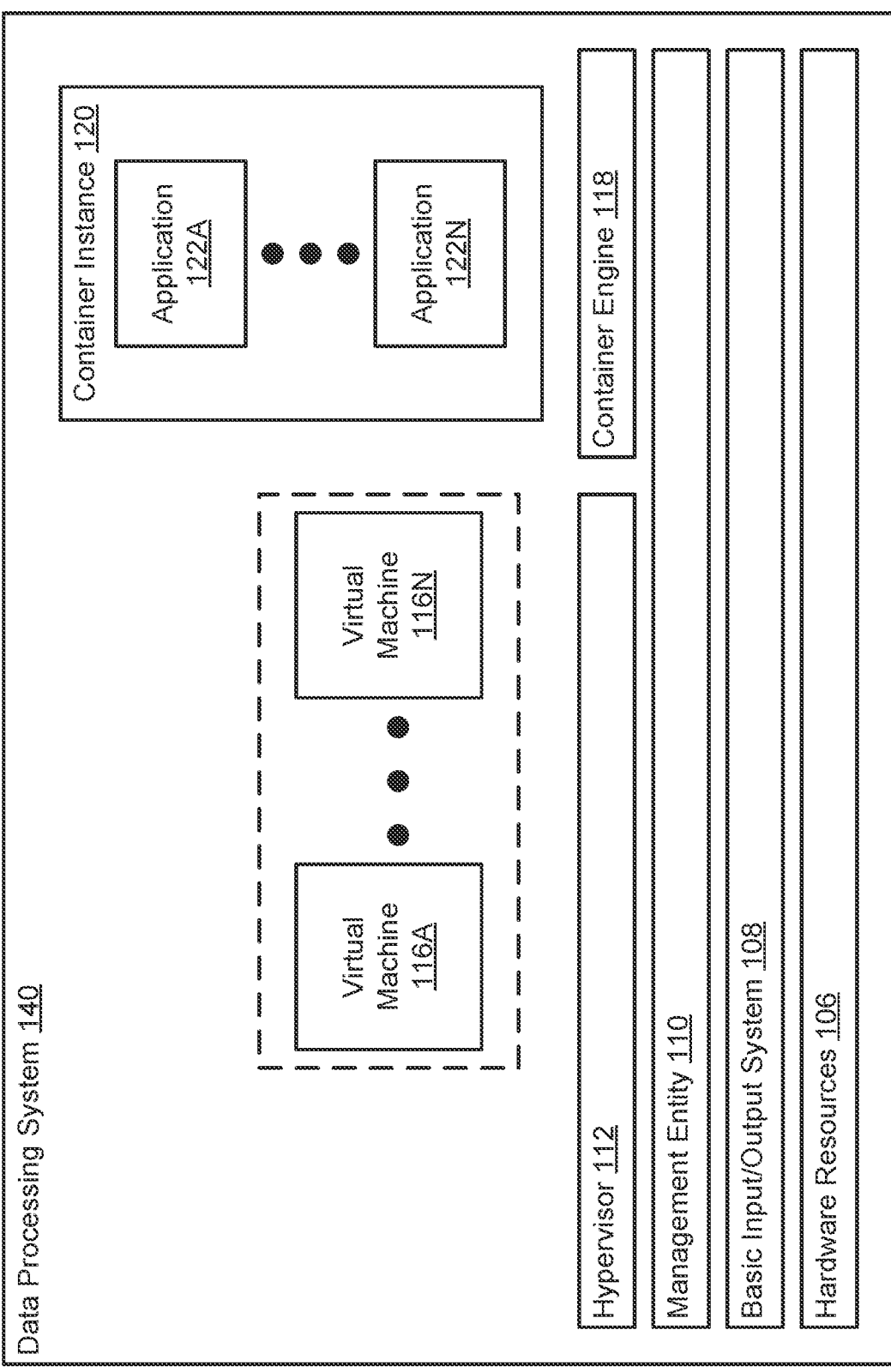
FIG. 1B shows a block diagram illustrating a data processing system in accordance with one or more embodiments.

Turning to FIG. 1B, a diagram illustrating data processing system 140 in accordance with an embodiment is shown. Data processing system 140 may be similar to any of the data processing systems 100 shown in FIG. 1A.

To provide computer implemented services, data processing system 140 may include any quantity of hardware resources 106. Hardware resources 106 may include physical parts of data processing system 140 that store and run software. Hardware resources 106 may include processors, memory modules (also referred to herein as "memory devices"), storage devices, and/or other types of hardware components usable to provide computer implemented services. A basic input/output system (BIOS) 108 may be stored on the processors and memory modules.

BIOS 108 may be used to startup data processing system 140. On the startup, BIOS 108 may configure peripheral devices, such as a keyboard, mouse, monitor, etc. With the peripheral devices, BIOS 108 may configure hardware resources 106 for use by data processing system 140. After BIOS 108 has configured the peripheral devices and hardware resources 106 for use by data processing system 140, management entity 110 may be activated.

Management entity 110 may be software similar to an operating system that is hosted by a processor of the data processing system 140. Management entity 110 may also be instantiated as any of drivers, network stacks, and/or other software entities that provide various management functionalities. Management entity 110 may interface between hardware and/or software in data processing system 140. Through interfacing, management entity 110 permits the software to access computing resources from the hardware (e.g., the hardware resources 106). Likewise, the hardware facilitates data processing by the software through use of the hardware resources 106. Hypervisor 112 and container engine 118 are software that may use the hardware resources 106 in data processing system 140. In an example of one or more embodiments, the management entity 110 may implemented using one or more Kubernetes-based pods (e.g., a group of one or more containers, with shared storage and network resources, and a specification for how to run the containers).

Hypervisor 112 may include software that enables operation of virtual machines 116A-116N. Each of virtual machines 116A-116N may host an operating system and one or more applications. Upon operation of virtual machines 116A-116N, hypervisor 112 may allocate computing resources (e.g., storage space in a memory device of the data processing system 140) to each of virtual machines 116A-116N from hardware resources 106 through management entity 110.

Alongside hypervisor 112, container engine 118 may host container instance 120. Container instance 120 may run applications 122A-122N. Applications 122A-122N may be run on container instance 120 separately from the OS of the data processing system 140.

Running applications 112A-122N on container instance 120 may require fewer computing resources (e.g., limited resources such as memory space and processing power, or the like, provided through the hardware resources 106) compared to running applications on virtual machines 116A-116N. Container instance 120 may include only necessary libraries, binaries, dependencies, and applications 112A-122N without allocating the computing resources to a separate OS. Thus, container instance 120 may startup faster and run more efficiently than virtual machines 116A-116N. Where computing resources are limited for applications 122A-122N, container instance 120 may be ideal for running applications 122A-122N.

Figure 1C:
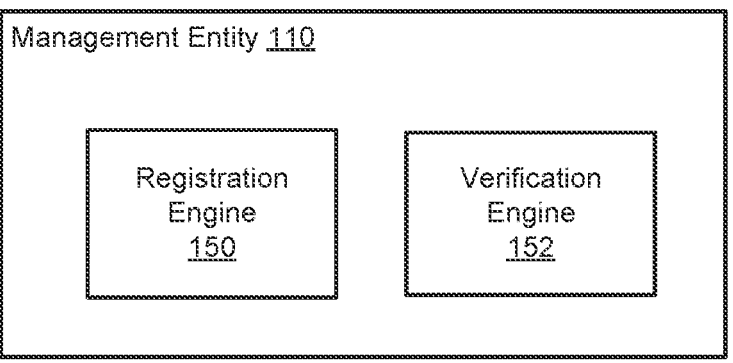
FIG. 1C shows a block diagram illustrating a management entity in accordance with one or more embodiments.

Turning now to FIG. 1C, management entity 110 may be configured to include a registration engine 150 and a verification engine 152. The registration engine 150 and the verification engine 152 may provide the various management functionalities of the management entity 110 using the processes of embodiments disclosed herein described below in reference to FIGS. 2A-2B.

Figure 1D:
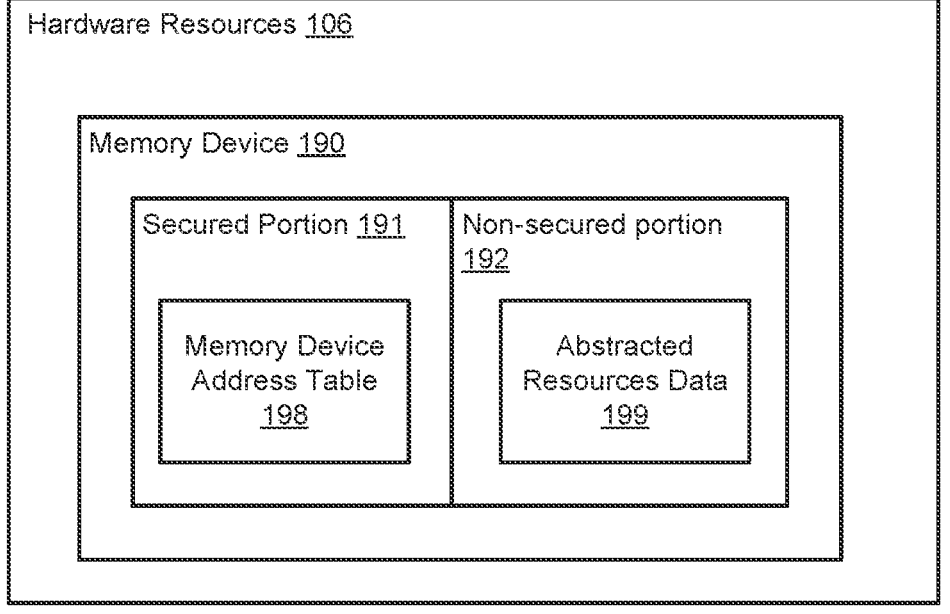
FIG. 1D shows a block diagram illustrating hardware resources in accordance with one or more embodiments.

Turning now to FIG. 1D, FIG. 1D shows an example of hardware resources 106 of data processing system 140. In this example, the hardware resources 106 in FIG. 1D includes a memory device 190 (e.g., non-volatile memory such as an NVMe SSD) that includes a secured portion 191 (e.g., a boot partition of the NVMe SSD protected by a relay protected memory block (RPMB), or the like) storing a memory device address table 198 and a non-secured portion storing abstracted resources data 199 (also referred to herein as "data associated with the plurality of abstracted resources").

To access and modify the secured portion 191, the data processing system 140 must use the management entity 110. Said another way, the data processing system 140 is configured such that, among all components and resources shown in FIG. 1B, only the management entity 110 is authorized to access (and modify the data stored in) the secured portion 191. For example, only the management entity 110 is configured with a device key (or any other form of authorization method) that is used to authenticate with one or more authentication protocols that protects the secured portion 191. More specifically, prevention of undesired, or hacked, code from running on a device (e.g., the data processing system 140) starts with an assurance that the very first piece of code that the processor reads and executes from the storage device (e.g., memory device 190) is legitimate. This initial code, the bootloader, may be located in a boot partition created in the memory device 190 and the boot partition must be write-protected from malware modification (e.g., using RPMB authentication, or the like). Every change to the boot partition requires the enabling procedure by using an authentication (e.g., the RPMB authentication). The secured write-protect mechanism is primarily used to protect the boot code or other sensitive data (e.g., memory device address table 198) on the memory device 190 from changes or deletion by unauthorized applications.

In embodiments, the memory device address table 198 may be stored in the secured portion 191 (e.g., the boot partition of the memory device 190). The memory device address table 198 may be a data structure of any size and of any format (e.g., a list, a table, or the like). The memory device address table 198 may store a plurality of memory address ranges. Each of the plurality of memory address ranges is a part of a full memory address range of the memory device 190, and none of the plurality of memory address ranges overlap. Each memory address range may indicate an amount of storage resources and a space within the memory device that is allocated for instantiating and maintaining operations of an abstracted resource of the abstracted resources (and/or allocated for performing other operations of the data processing system 140).

For example, assume that the memory device 190 has 8 GB of space and that creation of a VM (VM1) requires use of 1 GB of this 8 GB. When VM1 is created, the memory address range of the 1 GB in the available 8 GB of the memory device is also established (e.g., memory address range A-B covering 1 GB of data of available memory address range A-P covering the full 8 GB available in the memory device). This memory address range A-B allotted to VM 1 is then stored in the memory device address table 198 in the secured portion 191 of the memory device 190.

In embodiments, the abstracted resources data 199 may include all data required for maintaining and operating the abstracted resources (e.g., VMs 116A-116N and/or container instance 120) of the data processing system 140. For example, the abstracted resources data 199 may include data of each of the plurality of abstracted resources, data of a hypervisor (e.g., hypervisor 112) or a docker (e.g., container engine 118) that launches and controls each of the plurality of abstracted resources, and data of a special privileged domain that serves as an administrative interface between the hypervisor and each of the plurality of abstracted resources that is a VM. The non-secured portion 192 may also store, in addition to the abstracted resources data 199, host and/or user data (not shown) (e.g., traffic statistics, packet headers, service requests, operating system calls, file-system changes, files, documents, applications, or the like) associated with a main OS of the data processing system.

Figure 2A:
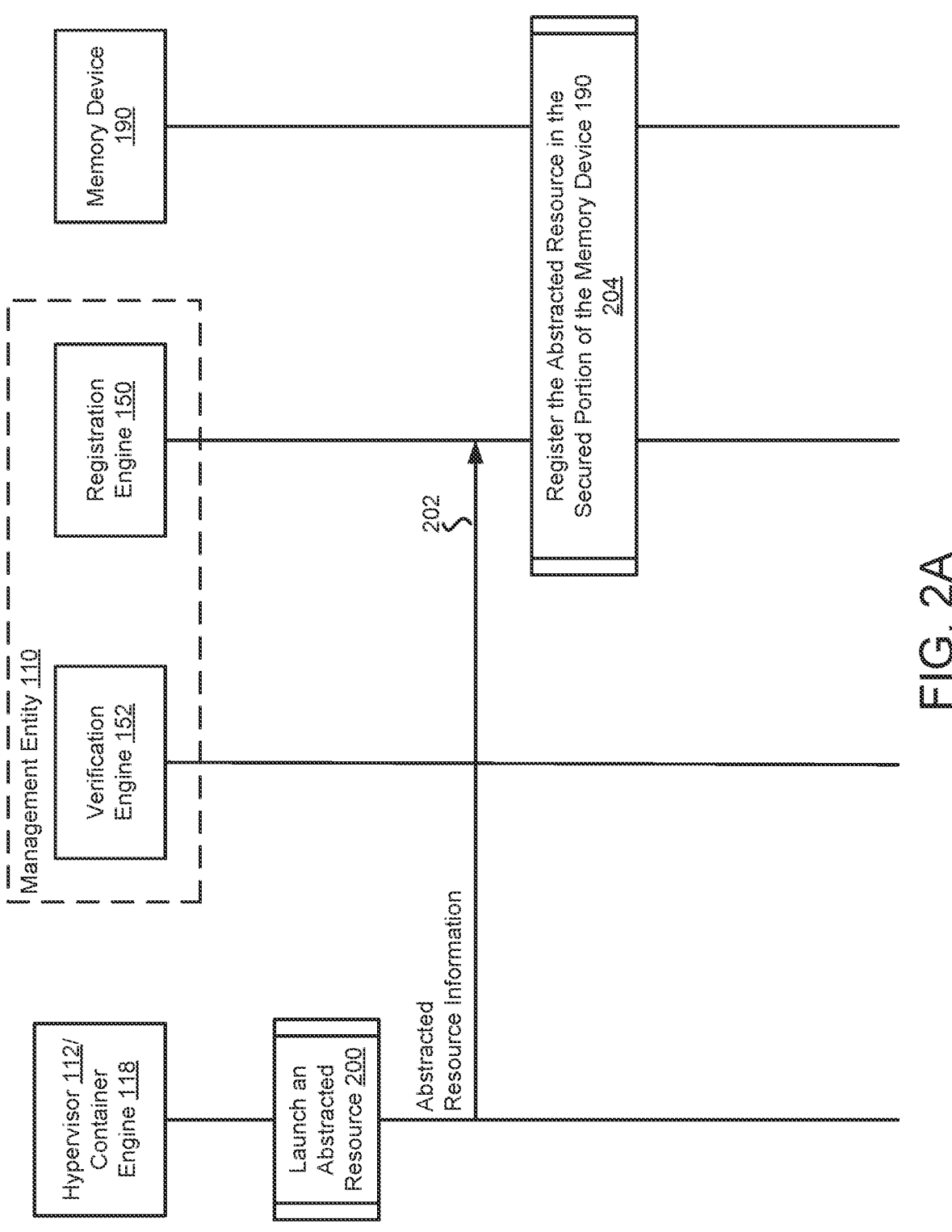
FIGS. 2A-2B show data flow diagrams in accordance with one or more embodiments.
Figure 2B:
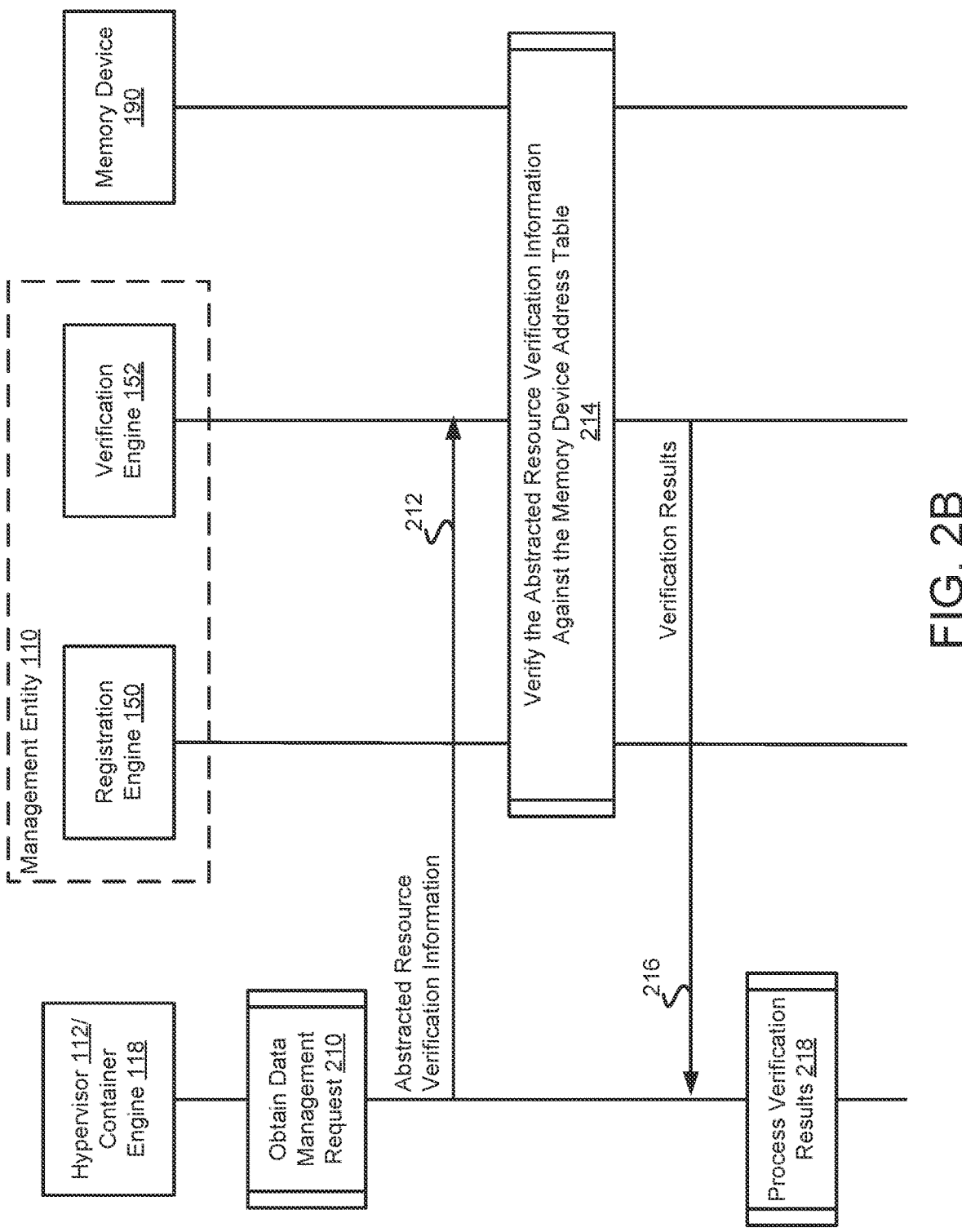

Turning to FIGS. 2A-2B, data flow diagrams in accordance with one or more embodiments are provided. The data flow diagrams of FIGS. 2A-2B show a process for managing access to a memory device (e.g., memory device 190 of FIG. 1B) of a data processing system that is shared between a plurality of abstracted resources hosted on the data processing system (such as computing devices, as described below in reference to FIG. 4; data processing system 140, FIG. 1B; any of data processing systems 100A-100N, FIG. 1A).

Starting with FIG. 2A, a hypervisor 112 or a container engine 118 may launch (e.g., as operation 200) an abstracted resource (e.g., a VM 116A by the hypervisor 112 and a container instance 120 by the container engine 118).

As part of launching the abstracted resource, the hypervisor 112 or a container engine 118 (e.g., in operation 202) may provide abstracted resource information to the registration engine 150 of the management entity 110. The abstracted resource information may include information such as: a name and/or identification (id) of the abstracted resource; a size of the abstracted resource; a memory address range of the memory device 190 used to instantiate and maintain the abstracted resource; and other characteristic and parameters of the abstracted resource.

In operation 204, the registration engine 150 registers the newly launched abstracted resource in the memory device 190. In particular, the registration engine 150 is configured to include the device key (or any other form of authentication mechanism) is that able to grant the management entity 110 (through registration engine 150) access and permission to modify the secured portion 191 of the memory device 190.

Using said authentication mechanism, the registration engine 150 may register the abstracted resource in the memory device by either, after successfully authenticating with the secured portion 191 using the authentication mechanism: (i) generating a memory device address table 198 (if one does not already exist) in the secured portion 191 of the memory device 190 and recording (e.g., writing) the memory address range associated with the newly launched abstracted resource with the name and/or id of the newly launched abstracted resource into the new memory device address table 198: or (ii) if the memory device address table 198 already exists in the secured portion 191, recording (e.g., writing) the memory address range associated with the newly launched abstracted resource with the name and/or id of the newly launched abstracted resource in the existing memory device address table 198.

In embodiments, operations 200 through 204 may be repeated for all newly launched abstracted resources until space in the memory device allocated for launching and maintaining abstracted resources is depleted. For example, if the memory device 190 has a total space of 2 TBs and at least 40 GBs of this space is reserved for (or currently being used by) other functionalities and operations of the data processing system 140 (e.g., such as maintaining the hypervisor 112 or the like) and/or security of the memory device 190 (e.g., an RPMB allocation, a boot partition allocation, or the like, of the memory device 190), operations 200 through 204 may be repeated until the remaining 160 GBs are used up (and/or may be repeated when sufficient space within the memory device 190 has freed up as a result of, for example, decommissioning and shut down of an abstracted resource or the like).

Each time operations 200 through 204 is repeated, any existing or newly created memory device address table 198 will be updated to include the abstracted resource information of any newly launched abstracted resource(s). Each of the abstracted resources is associated with a memory address range among memory address ranges stored in the memory device address table 198. None of the memory address ranges in the memory device address table 198 overlap. Each of the memory address ranges stored in the memory device address table 198 indicate an amount of storage resources (of the memory device 190) and a space within the memory device 190 that is allocated for instantiating and maintaining operations of respective ones of the abstracted resources.

Turning now to FIG. 2B, after an abstracted resource is launched by the hypervisor 112 or the container engine 118, the hypervisor 112 or the container engine 118 may obtain (e.g., from the abstracted resource, and in operation 210) a data management request. The data management request may include a request to access the memory device 190 (namely, the non-secured portion 192) in order to utilize (e.g., write, read, or share) the abstracted resources data 199. Said another way, the abstracted resource may transmit a request to write, read, or share its own data that is stored as part of the abstracted resources data 199 in the non-secured portion 192 of the memory device 190.

In the context of VMs, a VM (such as VM1 among a plurality of VMs 1-3) may initiate a hyper call that may first pass through a paravirtualization driver instantiated on a special privileged domain (e.g., domain 0) maintained by the hypervisor 112. The paravirtualization driver may then forward that hyper call (e.g., to verification engine 152, to the BIOS 108, to the hardware resources 106, or the like) to have the data processing system 140 fulfill the hyper call.

In embodiments, the data management request may include: (i) the name or id of the abstracted resource from which the data management request originated; (ii) a memory address range; (iii) the payload (e.g., including the instructions (e.g., read, write, share, or the like) and the data associated with the instructions (e.g., data to be written, read, shared, or the like)); or the like.

In operation 212, prior to sending the payload of the data management request to one or more components or resources of the data processing system 140 (e.g., to verification engine 152, to the BIOS 108, to the hardware resources 106, or the like) for fulfillment (e.g., execution of the payload), the hypervisor 112 or container engine 118 may provide (e.g., transmit) the name or id of the abstracted resource and the memory address range include in the data management request as abstracted resource verification information to the verification engine 152 of the management entity 110.

Using a VM architecture as an example, assume that above-discussed VM1 made the hyper call (e.g., the data management request). The abstracted resource verification information may include the name or id of VM and a memory address range (e.g., the memory address range registered to VM1, or another memory address range).

In operation 214, the verification engine 152 may (in combination with the registration engine 150 and the memory device 190) verify the abstracted resource verification information to permit (e.g., fulfill) or reject the data management request. In particular, the verification engine 152 may cause the registration engine 150 to check the memory address range provided in the data management request against the memory address range registered to the abstracted resource (that sent the data management request) in the memory device address table 198. Only if the two memory addresses match will the verification engine 152 permit fulfillment of the data management request. Else, the verification engine will reject the data management request.

For example, continuing with the above VM architecture example, assume that VM1 is registered to memory address range A-B in memory device address table 198, if the memory address range included in the data management request from VM1 is not memory address range A-B, the data management request from VM1 will be rejected (e.g., by verification engine 152). Else, if the memory address range included in the data management request from VM1 is memory address range A-B, the verification engine 152 will permit fulfillment of the payload (e.g., by the verification engine 152 directly or by the BIOS 108 or the hardware resources 106 of the data processing system 140).

In embodiments, when the memory address range included in the data management request matches the memory address range registered to the abstracted resource (that sent the data management request) as recorded in the memory device address table 198, the abstracted resource (that sent the data management request) may be granted access to the memory device 190 (namely, the non-secured portion of the memory device).

In embodiments, being granted access to the non-secured portion 192 of the memory device 190 provides a particular abstracted resource with access to only data in the non-secured portion 192 that is associated with that particular abstracted resource. Alternatively, being granted access to the non-secured portion 192 of the memory device 190 provides a particular abstracted resource with access to all data (e.g., all data making up abstracted resources data 199) stored in the non-secured portion 192 of the memory device 190.

In embodiments, in the case where being granted access to the non-secured portion 192 of the memory device 190 provides a particular abstracted resource with access to only data in the non-secured portion 192 that is associated with that particular abstracted resource, the particular abstract resource may only, for example: (i) write data into space of the memory device 190 denoted by the memory address range registered to that particular abstracted resource (e.g., in the above example of VM1, VM1 may only write data into memory address range A-B of the memory device); (ii) read existing data from the memory address range registered to that particular abstracted resource; and (iii) share existing data from the memory address range registered to that particular abstracted resource.

Alternatively, in the case where being granted access to the non-secured portion 192 of the memory device 190 provides a particular abstracted resource with access to all data (e.g., all data making up abstracted resources data 199) stored in the non-secured portion 192 of the memory device 190, that particular abstracted resource may read, write, and share data from any memory address range of the memory device 190.

As shown in operation 214, data associated with the abstracted resource(s) that is stored in the non-secured portion 192 of the memory device 190 is accessible by the abstracted resource(s) through verification using information stored in the secured portion 191 (e.g., the registered memory address range stored in the memory device address table 198) of the memory device 190.

In operation 216, the verification engine 152 may provide (e.g., transmit) a verification result of the verification of operation 214 to the hypervisor 112 or container engine 118.

In operation 218, the hypervisor 112 or container engine 118 may process the verification results to either fulfill (if not already done directly by the verification engine 152, and using the BIOS 108 or any of the hardware resources 106 of the data processing system 140) the data management request or notify the abstracted resource (that sent the data management request) that the data management request has been rejected.

Figure 3B:
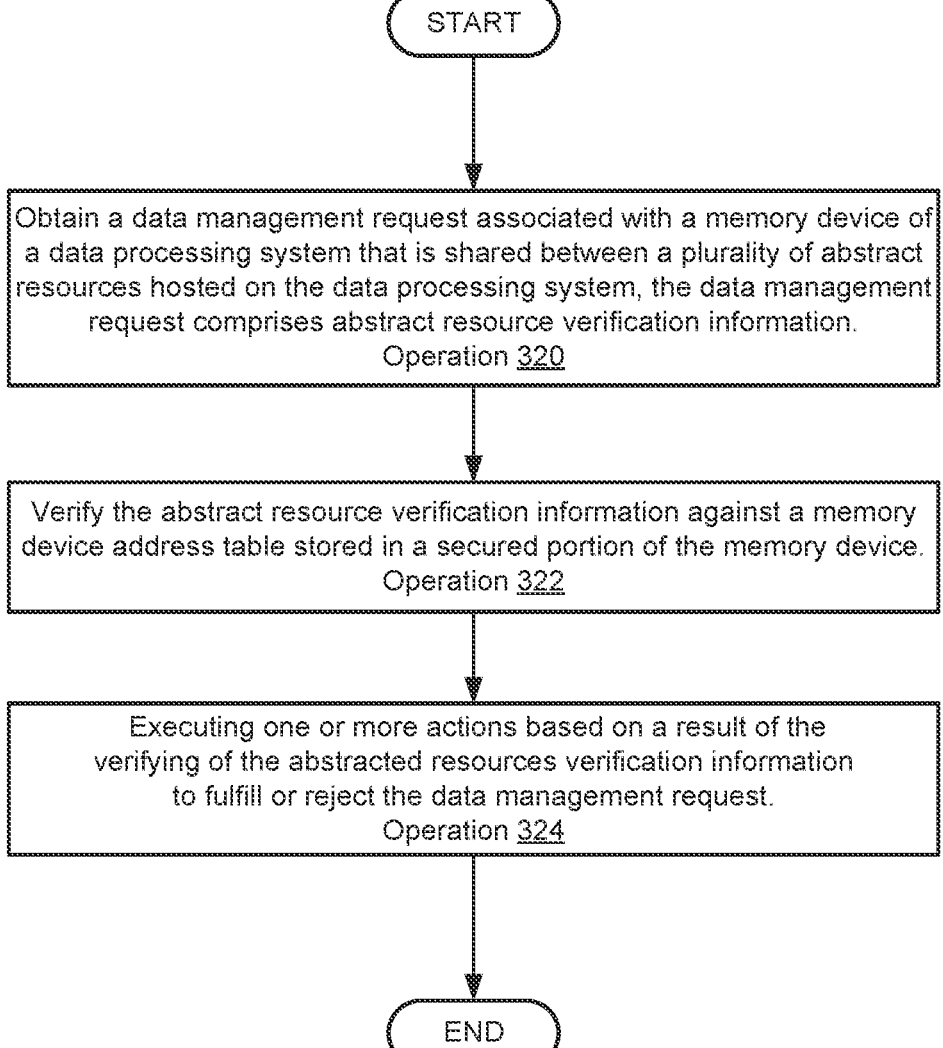

As discussed above, the components of FIGS. 1A-1D may perform various methods for managing a boot up process of a data processing system. FIGS. 3A-3B illustrate examples of methods that may be performed by the components of FIGS. 1A-1D. For example, any of the data processing systems 100 may perform all or a portion of the methods. In the diagrams discussed below and shown in FIGS. 3A-3B, any of the operations may be repeated, performed in different orders, and/or performed in parallel with or in a partially overlapping in time manner with other operations.

Starting with FIG. 3A, in operation 300, a management entity hosted by the data processing system may obtain abstracted resource information of a newly launched abstracted resource hosted by the data processing system.

In embodiments, and as discussed above in reference to FIGS. 2A-2B, the abstracted resource may be a virtual machine (VM), a container, or the like. The abstracted resource information may include (among other data discussed above in reference to FIGS. 2A-2B) a first memory address range. This first memory address range may indicate the specific amount of storage resources and the specific space within a memory device (e.g., memory device 190 of FIG. 1D) of the data processing system that is allocated for instantiating and maintaining this newly launched abstracted resource.

In operation 302, as discussed above in reference to FIGS. 2A-2B, the management entity (e.g., via a registration engine 150, of FIG. 1C and FIGS. 2A-2B) may register the first memory address range in a memory device address table (e.g., memory device address table 198 of FIG. 1D) stored in the memory device. The memory device address table may be stored in a secured portion (e.g., secured portion 191 of FIG. 1D) of the memory device.

In embodiments, the secured portion may only be accessible to management entity (namely, the registration engine of the management entity). More specifically, the secured portion may be protected using one or more security protocols (e.g., RPMB of an NVMe SSD) and only the registration engine of the management entity (among all other resources and components of the data processing system 140) is provided with an authentication mechanism/solution (e.g., an RPMB device key) for authenticating with the secured portion.

The process may end following operation 302.

Turning now to FIG. 3B, in operation 320, a data management request associated with a memory device of a data processing system that is shared between a plurality of abstract resources hosted on the data processing system may be obtained. The data management request may be obtained from an existing abstracted resources that is hosted on the data processing system.

For example, the data management request may be obtained from the newly launched abstracted resource in operation 300 of FIG. 3A after the newly launched abstracted resource is ready for use (e.g., after completion of the registration in operation 302 of FIG. 3A). The data management request may be obtained by the management entity (namely, a verification engine 152, of FIG. 1C and FIGS. 2A-2B, of the management entity).

As discussed above in reference to FIGS. 2A-2B, the data management request may include abstract resource verification information including at least a memory address range and a name or id of the abstracted resource that provided the data management request (among other parameters, information, specifications, or the like of the abstracted resource that provided the data management request).

In operation 322, the abstract resource verification information may be verified against the memory device address table stored in the secured portion of the memory device. And in operation 324, one or more actions may be executed (e.g., by the management entity) based on a result of the verifying of the abstracted resources verification information to fulfill or reject the data management request.

In particular, as discussed above in reference to FIGS. 2A-2B, the verification engine (of the management entity) may (in combination with the registration engine and the memory device) verify the abstracted resource verification information to permit (e.g., fulfill) or reject the data management request. In particular, the verification engine may cause the registration engine to check the memory address range provided in the data management request against the memory address range registered to the abstracted resource (that sent the data management request) in the memory device address table. Only if the two memory addresses match will the verification engine permit fulfillment of the data management request. Else, the verification engine will reject the data management request.

For example, using the above VM architecture example, assume that a VM1 is registered to memory address range A-B in memory device address table, if the memory address range included in a data management request from VM1 is not memory address range A-B, the data management request from VM1 will be rejected (e.g., by the verification engine). Else, if the memory address range included in the data management request from VM1 is memory address range A-B, the verification engine will permit fulfillment of a payload (e.g., by the verification engine directly or by the BIOS 108 or the hardware resources 106 of the data processing system) included in the data management request.

In embodiments, when the memory address range included in the data management request matches the memory address range registered to the abstracted resource (that sent the data management request) as recorded in the memory device address table 198, the abstracted resource (that sent the data management request) may be granted access to the memory device 190 (namely, the non-secured portion of the memory device).

In embodiments, being granted access to the non-secured portion of the memory device provides a particular abstracted resource with access to only data in the non-secured portion that is associated with that particular abstracted resource. Alternatively, being granted access to the non-secured portion of the memory device provides a particular abstracted resource with access to all data (e.g., all data making up abstracted resources data) stored in the non-secured portion of the memory device.

In embodiments, in the case where being granted access to the non-secured portion of the memory device provides a particular abstracted resource with access to only data in the non-secured portion that is associated with that particular abstracted resource, the particular abstract resource may only, for example: (i) write data into space of the memory device denoted by the memory address range registered to that particular abstracted resource (e.g., in the above example of VM1, VM1 may only write data into memory address range A-B of the memory device); (ii) read existing data from the memory address range registered to that particular abstracted resource; and (iii) share existing data from the memory address range registered to that particular abstracted resource.

Alternatively, in the case where being granted access to the non-secured portion of the memory device provides a particular abstracted resource with access to all data (e.g., all data making up abstracted resources data) stored in the non-secured portion of the memory device, that particular abstracted resource may read, write, and share data from any memory address range of the memory device.

The process may end following operation 324.

Any of the components illustrated in FIGS. 1A-3B may be implemented with one or more computing devices. Turning to FIG. 4, a block diagram illustrating an example of a computing device (also referred to herein as "system 400") in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system-on-a-chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth® transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing access to a memory device of a data processing system that is shared between a plurality of abstracted resources hosted on the data processing system, the method comprising:

performing a relay protected memory block (RPMB) authentication on an abstracted resource of the plurality of abstracted resources;

storing a memory device address table associated with the abstracted resource in a boot partition of the memory device, the boot partition being a secured portion of the memory device that is protected with the RPMB authentication and shared between the plurality of abstracted resources;

obtaining a data management request associated with the memory device, wherein the data management request comprises abstracted resource verification information, and wherein the data management request is a hyper call from the abstracted resource through a paravirtualization driver;

verifying the abstracted resource verification information against the memory device address table; and permitting or rejecting the hyper call based on a result of the verifying of the abstracted resource verification information.

2. The method of claim 1, wherein:

the verifying of the abstracted resource verification information is performed by a management entity hosted within the data processing system, the management entity and the plurality of abstracted resources are ones of a plurality of components and resources of the data processing system, and among the plurality of components and resources of the data processing system, the secured portion of the memory device is only accessible and modifiable by the management entity.

3. The method of claim 2, wherein the memory device is non-volatile memory, and each of the plurality of abstracted resources is a virtual machine (VM) or an application container.

4. The method of claim 2, wherein:

the abstracted resource is registered to a first memory address range stored in the memory device address table, the abstracted resource verification information comprises a second memory address range, and verifying the abstracted resource verification information against the memory device address table comprises determining whether the second memory address range matches the first memory address range.

5. The method of claim 4, wherein:

data associated with the plurality of abstracted resources is stored in a non-secured portion of the memory device and is accessible by the plurality of abstracted resources through verification using information stored in the secured portion of the memory device, the data management request comprises a request to access the non-secured portion storing the data associated with the plurality of abstracted resources, and in response to determining that the second memory address range matches the first memory address range, permitting or rejecting the hyper call comprises permitting the abstracted resource to access the non-secured portion of the memory device.

6. The method of claim 4, wherein, before the data management request is obtained from the abstracted resource, the method further comprises:

obtaining, by a registration engine of the management entity and when the abstracted resource is first launched by the data processing system, abstracted resource information of the abstracted resource, the abstracted resource information comprising the first memory address range; and registering, by the registration engine, the first memory address range in the memory device address table by modifying the memory device address table in the secured portion of the memory device to include the first memory address range.

7. The method of claim 6, wherein each of the plurality of abstracted resources is associated with a memory address range among a plurality of memory address ranges stored in the memory device address table, the first memory address range is one of the plurality of memory address ranges, and none of the plurality of memory address ranges overlap.

8. The method of claim 7, wherein each of the plurality of memory address ranges indicate an amount of storage resources and a space within the memory device that is allocated for instantiating and maintaining operations of respective ones of the plurality of abstracted resources.

9. The method of claim 7, wherein each of the plurality of abstracted resources is a virtual machine (VM) or an application container, and data associated with the plurality of abstracted resources is stored in a non-secured portion of the memory device.

10. The method of claim 9, wherein accessing the non-secured portion of the memory device provides the abstracted resource with access to only data in the non-secured portion that is associated with the abstracted resource and is accessible by the plurality of abstracted resources through verification using information stored in the secured portion of the memory device, and the data associated with the plurality of abstracted resources comprises data of each of the plurality of abstracted resources, data of a hypervisor or a docker that launches each of the plurality of abstracted resources, and data of a special privileged domain that serves as an administrative interface between the hypervisor and each of the plurality of abstracted resources that is the VM.

11. A non-transitory machine-readable medium having instructions stored therein, which when executed by a processor, cause the processor to perform operations for managing access to a memory device of a data processing system that is shared between a plurality of abstracted resources hosted on the data processing system, the operations comprising:

performing a relay protected memory block (RPMB) authentication on an abstracted resource of the plurality of abstracted resources;

storing a memory device address table associated with the abstracted resource in a boot partition of the memory device, the boot partition being a secured portion of the memory device that is protected with the RPMB authentication and shared between the plurality of abstracted resources;

obtaining a data management request associated with the memory device, wherein the data management request comprises abstracted resource verification information, and wherein the data management request is a hyper call from the abstracted resource through a paravirtualization driver;

verifying the abstracted resource verification information against the memory device address table; and permitting or rejecting the hyper call based on a result of the verifying of the abstracted resource verification information.

12. The non-transitory machine-readable medium of claim 11, wherein:

the verifying of the abstracted resource verification information is performed by a management entity hosted within the data processing system, the management entity and the plurality of abstracted resources are ones of a plurality of components and resources of the data processing system, and among the plurality of components and resources of the data processing system, the secured portion of the memory device is only accessible and modifiable by the management entity.

13. The non-transitory machine-readable medium of claim 12, wherein the memory device is non-volatile memory, and each of the plurality of abstracted resources is a virtual machine (VM) or an application container.

14. The non-transitory machine-readable medium of claim 12, wherein:

the abstracted resource is registered to a first memory address range stored in the memory device address table, the abstracted resource verification information comprises a second memory address range, and verifying the abstracted resource verification information against the memory device address table comprises determining whether the second memory address range matches the first memory address range.

15. The non-transitory machine-readable medium of claim 14, wherein:

data associated with the plurality of abstracted resources is stored in a non-secured portion of the memory device and is accessible by the plurality of abstracted resources through verification using information stored in the secured portion of the memory device, the data management request comprises a request to access the non-secured portion storing the data associated with the plurality of abstracted resources, and in response to determining that the second memory address range matches the first memory address range, permitting or rejecting the hyper call comprises permitting the abstracted resource to access the non-secured portion of the memory device.

16. A data processing system comprising:

a processor; and a memory device coupled to the processor, wherein the memory device stores instructions that cause the data processing system to perform operations for managing access to the memory device, the memory device being shared between a plurality of abstracted resources hosted on the data processing system, and the operations comprise:

performing a relay protected memory block (RPMB) authentication on an abstracted resource;

storing a memory device address table associated with the abstracted resource in a boot partition of the memory device, the boot partition being a secured portion of the memory device that is protected with the RPMB authentication and shared between the plurality of abstracted resources;

obtaining a data management request associated with the memory device, wherein the data management request comprises abstracted resource verification information, and wherein the data management request is a hyper call from the abstracted resource through a paravirtualization driver;

verifying the abstracted resource verification information against the memory device address table; and permitting or rejecting the hyper call based on a result of the verifying of the abstracted resource verification information.

17. The data processing system of claim 16, wherein:

the verifying of the abstracted resource verification information is performed by a management entity hosted within the data processing system, the management entity and the plurality of abstracted resources are ones of a plurality of components and resources of the data processing system, and among the plurality of components and resources of the data processing system, the secured portion of the memory device is only accessible and modifiable by the management entity.

18. The data processing system of claim 17, wherein the memory device is non-volatile memory, and each of the plurality of abstracted resources is a virtual machine (VM) or an application container.

19. The data processing system of claim 17, wherein:

the abstracted resource is registered to a first memory address range stored in the memory device address table, the abstracted resource verification information comprises a second memory address range, and verifying the abstracted resource verification information against the memory device address table comprises determining whether the second memory address range matches the first memory address range.

20. The data processing system of claim 19, wherein:

data associated with the plurality of abstracted resources is stored in a non-secured portion of the memory device and is accessible by the plurality of abstracted resources through verification using information stored in the secured portion of the memory device, the data management request comprises a request to access the non-secured portion storing the data associated with the plurality of abstracted resources, and in response to determining that the second memory address range matches the first memory address range, permitting or rejecting the hyper call comprises permitting the abstracted resource to access the non-secured portion of the memory device.

* * * * *